Jan. 25, 1927.

A. DE FRIES 1,615,361

BOLT FINISHING MACHINE

Filed May 29, 1925

Inventor:
Alfred de Fries
By Monroe E. Miller
Attorney.

Patented Jan. 25, 1927.

1,615,361

UNITED STATES PATENT OFFICE.

ALFRED DE FRIES, OF CASSEL, GERMANY.

BOLT-FINISHING MACHINE.

Application filed May 29, 1925, Serial No. 33,783, and in Germany March, 1925.

The present invention relates to machines for finishing bolt or screw blanks, and aims to provide novel and improved means for manipulating the bolt or screw blanks, so as to quickly and conveniently subject them to successive operations thereon.

In wholesale manufacture of bolts or screws, automatic machines are used so as to provide for quantity production. In some cases, however, when a limited number of bolts or screws are to be finished, or when bolts or screws of unusual shape or size are required, it is necessary to treat each bolt or screw blank separately. For this purpose, it is either customary to use pointing machines in combination with thread cutting machines, or to use pointing and shanking machines in combination with thread rolling machines, and after threading the nuts are screwed onto the bolts either by hand or machine.

It is the primary object of the invention to provide novel and improved means for the separate or individual treatment of bolts or screw blanks, or for equivalent purposes, in order to present the blank to successive finishing tools with facility and dispatch, requiring minimum manual effort and time.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
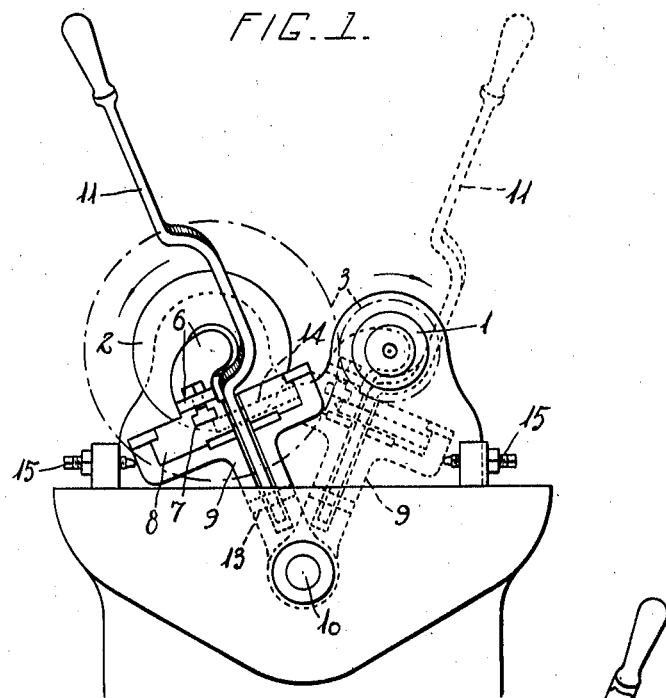
Figure 1 is a front view of the mechanism.
Figure 2:
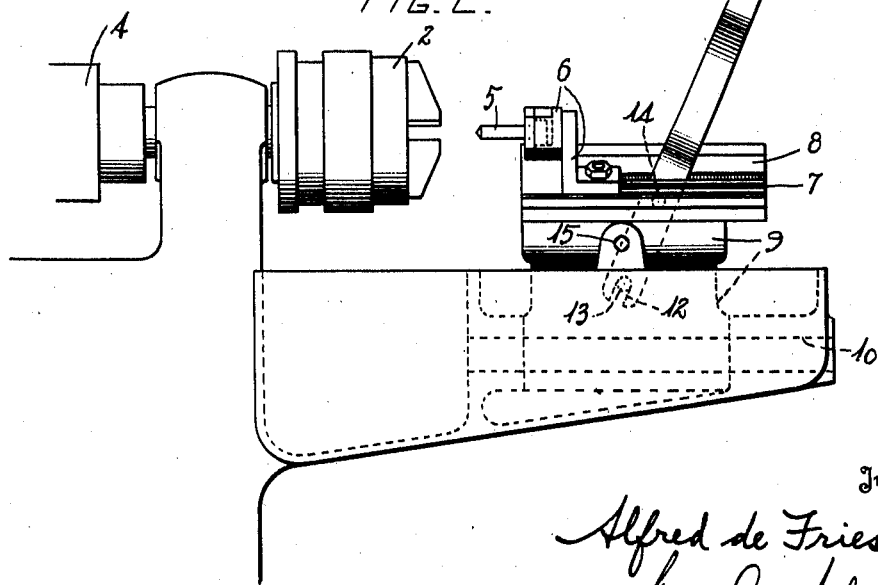
Fig. 2 is a side elevation thereof.

In the embodiment of the machine as illustrated, there are two rotary tools 1 and 2 mounted side by side on the frame and having parallel axes, and they are connected by gear wheels 3 to rotate in opposite directions, a cone pulley 4 or other means being provided for driving said tools. Said tools may be of different kinds for different work to be performed. For example, the tool 1 may be a bolt or screw pointer, and the tool 2 a threading die.

The blank 5 to be finished is dropped in and held by a work holder 6 which is adjustable longitudinally of the axes of the tools in a longitudinal slot 7 of a slide 8. Said slide is movable longitudinally of the axes of the tools in the head of an oscillatory support 9. Said support or member 9 is of T-shaped cross-section, and the lower portion thereof is mounted for turning movement on a longitudinal shaft 10 mounted in the frame, whereby said support or member is capable of oscillation transversely of the axes of the tools above the axis of the shaft 10 which is parallel to the axes of the tools. The oscillatory or rocking motion of the member 9 enables the work holder 6 to be moved transversely in registration with either tool, and the longitudinal motion of the slide 8 enables the work holder to be moved to and from the tool with which the work holder registers.

The work holder is manipulated by a single hand lever 11, the lower terminal of which is received by slots in the slide 8 and member 9. The lower end of the lever 11 has a slot 12 receiving a fulcrum pin 13 secured in the member 9 to mount the lever for oscillation toward and away from the tools, and a pivot pin 14 secured in the slide 8 also engages said lever so that the slide is moved forwardly and rearwardly when the lever is oscillated forwardly and rearwardly, and the member 9, slide 8 and work holder are oscillated transversely with the lever 11.

Adjustable stops 15, such as screws, are mounted on the frame to limit the movement of the member 9 in opposite directions so as to stop the work holder directly in alinement with the tools when the lever 11 is oscillated transversely.

In operation, the blank 5 is introduced or inserted in the work holder 6, and the lever 11 is then swung transversely to the dotted line position as seen in Fig. 1, thereby bringing the blank 5 in alinement or registration with the tool 1. The lever 11 is then swung toward the tool 1, thereby bringing the blank 5 into engagement with said tool which will point, machine or otherwise operate on the blank. When the tool 1 has finished its work, the blank 5 is retracted from the tool by swinging the lever 11 away from the tool, and the lever 11 is then swung transversely to the full line position as seen in Fig. 1, thereby bringing the blank in alinement or registration with the second tool 2. The operation as with the tool 1 is repeated, the lever 11 being swung toward the tool 2 so that it operates on the blank, and the blank then being retracted by swinging the lever 11 away from the tool 2. The finished blank is then removed from the work holder 6, and a new blank inserted and the operation repeated. It will be noted that by the manipulation of a single lever or handle the blank is readily moved or manipulated for successive operations thereon by the tools.

The tools used may vary, according to the work to be accomplished. If, for example, the tool 1 is a pointing tool, and the tool 2 is a threading die, the operator has ample time during the threading operation of a blank in the machine, to screw a nut on the previously finished bolt or screw, and the bolt or screw is therefore ready for sale without requiring further treatment.

Having thus described the invention, what is claimed as new is:—

1. In a machine of the character described, a plurality of tools, a work holder, means for mounting said work holder for registration with said tools in succession and for movement to bring the work into and out of engagement with the tools, and a lever operably connected with the work holder and arranged to swing in different directions for either moving said work holder into and out of registration with said tools or moving the work holder toward and away from the tool with which it registers.

2. In a machine of the character described, tools rotatable about parallel axes, a work holder, means for mounting said work holder for movement transversely of said axes to register with the tools in succession and for movement longitudinally of said axes to and from the tools, and a lever carried by said means and operably connected with the work holder and arranged to swing in different directions for either moving said work holder transversely of said axes or moving it longitudinally of said axes.

3. In a machine of the character described, a plurality of tools, a work holder, means for mounting said work holder for oscillation to bring it in registration in succession with said tools and for sliding movement to and from said tools, and a lever operably connected with said work holder and arranged to swing in different directions to either oscillate with the work holder or to slide said work holder to and from the tool with which it registers.

4. In a machine of the character described, tools rotatable about parallel axes, a work holder, means for mounting said work holder for oscillation transversely of said axes to bring the work holder into registration in succession with said tools and for movement longitudinally of said axes to and from the tools, and a lever carried by said member operably connected with the work holder and arranged to either oscillate therewith or to move the work holder longitudinally of said axes.

5. In a machine of the character described, a plurality of tools rotatable about parallel axes, an oscillatory member movable transversely of said axes, a slide mounted on said member and slidable relatively to said member in the direction of said axes to and from the tools, and a work holder carried by the slide.

6. In a machine of the character described, a plurality of tools, an oscillatory member, a slide on said member, a work holder carried by the slide, the slide being movable to and from the tools and said member being adapted to be oscillated to bring the work holder in registration with the tools, and a lever pivotally connected to both said slide and said member so as to oscillate in different directions for either oscillating said member or moving the slide on said member.

7. In a machine of the character described, a plurality of tools rotatable about parallel axes, a member movable transversely of said axes, a slide mounted on said member and slidable relatively to said member longitudinally of said axes toward and away from said tools, and a work holder carried by said slide.

8. In a machine of the character described, a plurality of tools rotatable about parallel axes, a member movable transversely of said axes, a slide movable on said member longitudinally of said axes, a work holder carried by the slide for movement therewith to and from the tools and for movement with said member into registration with the tools in succession, and a single handle member operatively connected with said slide and member for moving either of them.

In testimony whereof I hereunto affix my signature.

ALFRED DE FRIES.